United States Patent Office 2,956,961
Patented Oct. 18, 1960

2,956,961

POLYESTER-URETHANES DERIVED FROM CYCLOHEXANEDIMETHANOL AND TEXTILE FABRIC COATED THEREWITH

Charles J. Kibler, Alan Bell, and James G. Smith, Kingsport, Tenn., assignors to Eastman Kodak Company, Rochester, N.Y., a corporation of New Jersey No Drawing. Filed Apr. 11, 1958, Ser. No. 727,796

14 Claims. (Cl. 260—2.5)

This invention relates to a process for preparing a polyester-urethane comprising reacting together (1) a hydroxyl-terminated polyester having a molecular weight above about 500 principally prepared from bifunctional reactants including a dicarboxylic compound and a glycol, said polyester preferably having a hydroxyl number of from 30 to 140 and an acid number of from 0 to 15 and a weight average molecular weight of from about 700 to about 3500, and (2) at least one organic polyisocyanate, containing at least 50 mole percent of a diisocyanate, said reacting being accomplished with agitation and curing the reaction mixture in a shape determined by the space in which it is contained at about 50°–140° C. In particular, this invention provides the improvement in such a process consisting of employing at least 50 mole percent of a position isomer or stereoisomer of cyclohexanedimethanol (cis or trans, 1,4-, 1,3-, 1,2- and 1,1-isomers) as said glycol.

This invention does not relate to simple polyurethanes made from 1,4-cyclohexanedimethanol condensed with a diisocyanate nor to the corresponding simple polyesters as such. This invention relates to only block polymers which contain polyester block units connected by reaction with polyisocyanates to form urethane linkages between the blocks.

It is an object of this invention to provide polyester-urethanes that have improved resistance to hydrolysis. It is a further object of this invention to provide polyester-urethanes that have improved heat stability.

Another object of this invention is to provide polyester-urethanes that are of particular value as rubber substitutes, foamed plastics, adhesives, protective coatings, fabrics, fibers, films, molding compositions, textile treating materials, etc.

The generic character of this invention is set forth in the first paragraph of this specification. More specifically, this invention provides, among other things, an improved process for preparing an elastomeric polyester-urethane made by the following general procedure comprising (A) reacting together at least the following ingredients (1) a liquid polyester principally prepared from bifunctional reactants including at least one dicarboxylic compound containing at least 3 carbon atoms and at least one glycol, said polyester having a hydroxyl number of from 30 to 140 and an acid number of from 0 to 15 and a weight average molecular weight of from about 700 to about 3500, and (2) at least one organic polyisocyanate, containing at least 50 mole percent of a diisocyanate, the ratio of the equivalents of said polyisocyanate to the equivalents of said polyester based on its hydroxyl content being from about 1.0 to about 2.0 (preferably 1.1 to 2.0), said reacting being accomplished with agitation for a short period of time, and (B) curing the reaction mixture in a shape determined by the space in which it is contained at about 50°–140° C. The improvement provided by this aspect of the invention consist of employing at least 50 mole percent of cyclohexanedimethanol as said glycol.

Preferably, this invention involves the use of 1,4-cyclohexanedimethanol as a mixture of cis and trans isomers, however, either isomer can be used alone. Moreover, the 1,3-, the 1,2- and the 1,1-isomers can be used, either in cis or trans form (the 1,1-isomer has no stereoisomers). According to an illustrative embodiment, said dicarboxylic compound is adipic acid, said glycol is a mixture of cis and trans 1,4-cyclohexanedimethanol, and said polyisocyanate is the commercially available m-tolylenediisocyanate. This last compound is actually a mixture of 2,4- and 2,6-tolylenediisocyanate, in which the ratio of isomers varies slightly with the commercial source. Other specific embodiments will also be apparent.

This invention also provides as another specific aspect of the invention, a process for preparing a polyester-urethane foam made by the following general procedure comprising (A) reacting together at least the following ingredients (1) a liquid polyester principally prepared from bifunctional reactants including at least one dibasic carboxylic compound containing at least 3 carbon atoms and at least one glycol, said polyester having a hydroxyl number of from 30 to 140 and an acid number of from 0 to 15 and a weight average molecular weight of from about 700 to about 3500, (2) at least one organic polyisocyanate, containing at least 50 mole percent of a diisocyanate, the ratio of the equivalents of said polyisocyanate to the equivalents of said polyester based on its hydroxyl content being from about 2.0 to 4.5, and (3) water, there being from 0.8 to 1.5 equivalents of water for each equivalent of said polyisocyanate in excess of the equivalents of said polyester, said reacting of (1), (2) and (3) being accomplished with agitation for a short period in the presence of an emulsifier composition so as to form a foamed liquid, (B) allowing the foamed liquid reaction mixture to form a solid foamed product shaped as determined by the space in which it is contained, and (C) curing the foamed product at 50°–100° C. The improvement provided according to this aspect of the invention consists of employing at least 50 mole percent of cyclohexanedimethanol as said glycol.

According to an illustrative embodiment said dicarboxylic compound is azelaic acid, said glycol is a mixture of cis and trans isomers of 1,4-cyclohexanedimethanol and said polyisocyanate is the above-mentioned commercially availabe m-tolylenediisocyanate. Other specific embodiments will also be apparent.

As already made evident, the objects of the invention are accomplished by treating certain types of low-molecular-weight polyesters with polyisocyanates. The low-molecular-weight polyester is derived from a cyclohexanedimethanol, generally as the free glycol although acetates and other esters thereof can be used.

The products of the invention are useful as rubber substitutes and can be used for the manufacture of automobile tire treads. Since such elastomeric polyester-urethanes have excellent resistance to solvents, they can be used as gaskets and packing materials. An important property of the new polyester-urethanes provided by this invention is their high degree of heat stability. They retain their toughness and rubbery qualities at temperatures well in excess of 100° C. for extended periods of time.

A very important property of the new polyester-urethanes provided by this invention is their resistance to hydrolysis. It is well known that polyesters made from aliphatic dicarboxylic acids such as succinic, adipic, etc. are very readily hydrolyzed and polyester-urethanes made from such polyesters are also subject to hydrolysis. This is especially true for polyesters made from ether glycols such as diethylene glycol. Hence, it was quite unexpected to find that polyesters made from such acids or glycols wherein at least half of the glycol was cyclohexanedimethanol could be used in the preparation of polyester-urethanes which have greatly improved resistance to hydrolysis. It is thus apparent that the polyester-urethanes provided by this invention represent an important advance in the art. They combine good high temperature properties with improved resistance to hydrolysis as well as many other valuable properties such as excellent resistance to solvents, etc.

The production of polyester-urethanes, elastomers, foams and the like is described in numerous patents and in the literature. Reference is made to Angew. Chem., 62, 57–66 (1950); 64, 523–31 (1952). See also Modern Plastics, June 1947, page 149. It is not believed appropriate or necessary to indulge in a lengthy discussion in this specification as to the various details which can be employed in the preparation of polyester-urethanes of the type with which this invention is concerned. As has been indicated above, this invention relates, so far as the process is concerned, to the important contribution of cyclohexanedimethanol which can be used so as to produce polyester-urethanes having unexpectedly advantageous properties. Of course, the prior art contains teachings that glycols in general can be used in such processes. This invention resides to a large measure in the selecting as the glycol isomers of cyclohexanedimethanol whereby polyesterurethanes are obtained which have remarkably advantageous properties which could not have been predicted by those having ordinary skill in the art.

The preparation of the polyesters used in accordance with this invention is analogous to that described in our copending application Ser. No. 554,639, filed December 22, 1955, now U.S. Patent No. 2,901,466, dated August 25, 1959. The polyesters used may contain other glycols but should contain at least 50 mole percent of a cyclohexanedimethanol. In some cases it is advantageous that the polyester be derived in part from a minor amount of an alcohol that contains 3 or more hydroxyl groups. Suitable examples of such polyhydric alcohols includes glycerine, pentaerythritol, trimethylolpropane, trimethylolethane, etc. In most cases from 2 to 25 mole percent of such a polyhydric alcohol can be advantageously employed when it is desired to produce polyester-urethanes in accordance with this invention which have properties attributable to the presence of cross-linking components. Such properties include further improvements in the resistance to hydrolysis.

Additional glycols which can be employed in the preparation of polyesters are described in the above mentioned copending application. Such glycols can include ethylene glycol, trimethylene glycol, tetramethylene glycol, pentamethylene glycol, hexamethylene glycol, octamethyene glycol, neopentyl glycol, etc. The glycol may contain one or more secondary hydroxy groups as represented by 1,2-propylene glycol, 1,2-butylene glycol, 1,3 - butylene glycol, 2,3 - butylene glycol, 2,2,4 - trimethyl-1,3-pentanediol, etc. Glycols containing one or more ether groups as represented by diethylene glycol, triethylene glycol, tetraethylene glycol, dipropylene glycol, 2,2′-oxydibutanol, 4,4′-oxydibutanol,

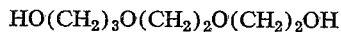

etc., as well as polyalkylene oxides such as polyethylene oxide such as polyethylene oxide or polypropylene oxide having a molecular weight of 500–2000 and terminated in hydroxy groups can also be used.

The dicarboxylic acids which can be employed in making the polyesters preferably contain from 3 to 40 carbon atoms, e.g., 2,2-dimethylmalonic acid, succinic acid, adipic acid, azelaic acid, 2-ethyladipic acid, 2-ethyl-3-methylglutaric acid, sebacic acid, suberic acid, glutaric acid, eicosanedioic acid, 8-ethyl-octadecanedioic acid, low polymers of saturated and unsaturated fatty acids containing up to 40 carbon atoms and having two carboxyl groups, etc. The latter acids are commercially available from sources such as Emery Industries and such acids do not necessarily have known molecular structures, hence they are referred to commercially as "Emery acids" as sold by Emery Industries, "$C_{20}$ dibasic acid," obtained from Shell Dev. Co., etc. Other dicarboxylic acids can be used as well as mixtures of acids, e.g. oxalic acid, sulfonyldibenzoic acid, terephthalic acid, cyclohexanedicarboxylic acids, etc. Since the free dialkylmalonic acids tend to decarboxylate at temperatures above 120° C., it is preferred to use the lower alkyl esters of such acids in the preparation of polyesters.

The reaction between a dicarboxylic acid ester and glycol is catalyzed by the known ester interchange catalysts such as sodium alkoxides, calcium oxide, litharge, titanium alkoxides, zinc acetate, $TiO_2$, fluorotitanates, cadmium acetate, lithium hydride, etc.

The diisocyanates which can be used in the reactions according to this invention include 2,4-tolylenediisocyanate, 2,6-tolylenediisocyanate and mixtures of these isomers, hexamethylene-diisocyanate, tetramethylenediisocyanate, 4,4′-methylenediphenylenediisocyanate, 4,4′-biphenylenediisocyanate, decamethylenediisocyanate, etc. Compounds containing three isocyanate groups may also be used. In general, any diisocyanate or mixtures with a triisocyanate can be employed.

The isocyanates may be mixed with the polyesters by means of rolls, sigma-blade mixers, etc. The particular ratio of isocyanate to polyester used will depend upon such factors as amount of free hydroxyl group present, molecular weight of the polyester, molecular weight of the isocyanate, type of product desired, etc.

For the production of foamed products, it is desirable to add a small amount of water to the mixture of polyester and isocyanate in order to promote gas formation. Catalysts such as amines, hydroxyamines, salts, etc., can be used.

Although the hydroxy-terminated polyesters are preferred whereby foaming is achieved through the use of water, the carboxyl terminated polyesters can also be employed and foaming is achieved since reaction with a polyisocyanate produces carbon dioxide. For preparing a rigid polyester foam a short linear aliphatic, cycloaliphatic, or aromatic dibasic acid or ester is preferred. For flexible foams long chain linear aliphatic dicarboxylic acids would be preferred. The use of linear dicarboxylic acids containing one or more ether linkages increase the flexibility of the resulting foam.

As already made clear, this invention is restricted to the preparation of polyester-urethanes from hydroxy-terminated polyesters.

In the preparation of urethane foams there must always be an excess of isocyanate since this excess produces the foaming action. The ratio of equivalents of diisocyanate to equivalents of polyester varies from 2.0 upwards, but is preferably in the range of 2.0 to 4.5.

The amount of water used in preparing a urethane foam is at least sufficient to react with all the excess isocyanate.

An excess over this may be added. This can be illustrated by considering Example 3 set forth below. In this example, 80 grams of the polyester (molecular weight 1194, equivalent weight 750) amounts to 0.11 equivalent and 30 g. of tolylenediisocyanate amounts to 0.35 equivalent. The excess is 0.24 equivalent so that at least 2.15 g. of water (equivalent weight 9) must be used. In Example 3, 20% excess of 2.5 g. of water was used. The ratio of equivalents of water to equivalents of excess diisocyanate is preferably in the range 1.0 to 4.0.

In the preparation of foams it is preferred to use those emulsifiers which are anhydrous liquids such as Emulphor EL–719 (Antara Chemical) and Triton X–100 (Rohm & Haas Co.). The use of aqueous solutions of emulsifiers is possible but necessitates additional calculation and careful control of the total amount of water added to the reaction mixture. A solid emulsifier can be used but it should be dissolved in the reagents first, in order to insure a homogeneous solution. Triton X–100 is understood to be a condensation product of an alkyl phenol and ethylene oxide. Emulphor EL–719 is understood to be an aliphatic polyglycol ester-ether in the form of a liquid. Other emulsifiers include polycarboxylic blends, sulfonated fatty oil acids, reaction products of ethylene oxide with polyoxyethylene sorbitan mono-oleate, etc. There is nothing special in regard to the particular emulsifier used and any one that is convenient can be employed.

The amount of any triisocyanate used depends on the degree of cross-linking desired. From 0 to 25 mole percent of the isocyante used can be a triisocyanate.

The polyesters used in the present invention are best prepared from esters of a dicarboxylic acid by ester interchange. A molar excess of 5% to 20% glycol can be advantageously used, depending upon the molecular weight desired. The larger the excess of glycol, namely cyclohexanedimethanol, the lower will be the molecular weight of the polyester. The glycol and dicarboxylic ester are heated, with a suitable catalyst, at 140–180° C. in a vessel equipped with a distillation column. Alcohol is removed through the column while glycol is condensed and returned to the reaction mixture. From 2–6 hr. are required to remove 75–85% of the theoretical amount of alcohol. The temperature is then raised to 190–230° and held for 1–3 hr. to drive out substantially all of the alcohol. A moderate vacuum of 100 mm. is then applied for 1–2 hr. in order to remove the last traces of alcohol. In large scale production, reproducibility from batch to batch is achieved by making analyses for hydroxyl group content, measuring the viscosity of the product at intervals, or measuring the torque on the stirrer during the reaction.

The polyesters can be made by direct esterification methods, wherein the free acid is heated with the glycol in the presence or absence of a catalyst. Suitable catalysts include sulfuric acid, zinc chloride, toluenesulfonic acid, titanium tetrabutoxide, sodium hydrogen titanium hexabutoxide, etc. (Caldwell U.S. Patent 2,720,502, etc.). If excess acid is used, the polyester is terminated with carboxyls. This type polyester is suitable for the manufacture of foams since a mole of carbon dioxide is produced when reacted with the diisocyanate. When an excess of diol is used, the polyester is terminated with hydroxyls. This type will react with diisocyanates to form rubbers, and these can also be foamed by the incorporation of a trace of water at the time of reaction.

In the preparation of polyesters a free acid and a glycol (including cyclohexanedimethanol) can be heated at 200–250° C. for two to six hours until evolution of water has ceased. A vacuum can then be applied and the melt held at 220–260° C. until the volatile materials have been removed. This usually takes from about ten minutes to one hour. The reaction leading to the preparation of the polyesters from acids and diols can be stopped at any time by cooling. However, the required molecular weight is controlled by the ratio of reagents. The polymer ceases to form when all the carboxylic acid groups have reacted completely.

The ratio of glycols used (cyclohexanedimethanol and any ether glycol present) to the dicarboxylic acids or esters used determines the molecular weight of the final polyester. For example, if adipic acid is used, a polyester of molecular weight approximating 4,000 arises from 16 moles of 1,4-cyclohexanedimethanol and 15 moles of adipic acid. A polyester of molecular weight approximating 1,000 arises from five moles of 1,4-cyclohexanedimethanol and four moles of adipic acid. This range of molecular weights includes useful values; however, a range of from about 700 to not much above 3500 is generally to be preferred.

When an ester of a dicarboxylic acid and a diol are used and the polyester formed by alcoholysis in the presence of a catalyst, the required molecular weight can be attained by cooling the reaction product after holding it for a predetermined time under vacuum.

The amount of trifunctional compounds such as trihydroxy glycols and tri-isocyanates determines to a large extent the texture or rigidity of the final product. In general, less than about 5–10 mole percent of a trifunctional compound tends to give flexible, rubbery products, while more than about 15–25 mole percent tends to give hard, rigid products.

The texture of the products also can be controlled to some degree by the ratio of isocyanate groups to free hydroxyl groups. Flexible, rubbery products are generally obtained when the isocyanate added is approximately equivalent to the free hydroxyl groups in the polyester. That is, there is no substantial excess of isocyanate groups over hydroxyl groups. When excess isocyanate is added, it tends to act as a cross-linking agent, thus increasing the stiffness and rigidity of the product. At levels of 25–40% excess isocyanate, the products are usually classified as "rigid" types.

The references given above describe the production of foamed polyurethane plastics. A detailed description is also given in "Plastics Progress 1955," pp. 81–92. Other references include S.A.E. Journal, 61, 24 (1953); Product Engineering, 26, 140–143 (1955); copending application Ser. No. 707,461, filed on January 7, 1957, by Paul T. Von Bramer; etc. These references give numerous detailed examples of emulsifiers, foam stabilizers, catalysts, proportions, etc., none of which are worth further elaboration in this specification.

The two most important classes of products are the flexible, rubbery materials (for tires, solvent resistant hose, etc.) and the flexible foams (for upholstery, shock absorbers, sound insulation, heat insulation, etc.).

This invention can be further illustrated by the following examples of preferred embodiments although it will be understood that these examples are included merely for purposes of illustration and are not intended to limit the scope of the invention unless otherwise specifically indicated.

EXAMPLE 1

A mixture of 115.2 g. (0.8 mole) of 1,4-cyclohexanedimethanol and 102.2 g. (0.7 mole) adipic acid was placed in a flask equipped with a stirrer, nitrogen inlet tube, and a distilling head. This mixture was heated with stirring at 200–243° C. for 4 hours during which time 23 ml. of water was collected. Vacuum was applied to the system for several minutes to remove the last traces of water.

This product had an average molecular weight of about 1900 and was a semisolid mass. Since it contains two free hydroxyl groups, the equivalent weight was about 950.

This polyester can be mixed with the diisocyanates such as those hereinabove listed to give tough rigid polyurethane resins.

In a typical preparation, 190 parts of the polyester was mixed with 32 parts of m-tolylenediisocyanate. This is approximately 100% of diisocyanate over the amount required to react with hydroxyl groups. The excess diisocyanate serves as a cross-linking and vulcanizing agent. The mixing was carried out as rapidly as possible at 60° C. The mixture was then placed in a mold and heated at 90–100° C. for 1 hour to give sheets 6″ x 6″ x ⅛″. These sheets had high tensile strength and showed substantially no hydrolysis when heated in water at 100° C. for 4 days.

EXAMPLE 2

A mixture of 7 moles of 1,4-cyclohexanedimethanol and 6 moles of azelaic acid was condensed as in Example 1 by a similar procedure to give a polyester of molecular weight about 1600–1700. This polyester was also prepared in a much shorter time by using a titanium alkoxide as catalyst. When esters of the dibasic acid are employed, it is essential to use a catalyst such as $Ti(OBu)_4$, $Zn(OAc)_2$, etc. It may also be prepared by the use of toluenesulfonic acid catalyst, but the product must be thoroughly washed to remove the catalyst.

When mixed with m-tolylenediisocyanate as in Example 1 at 30° C. and cured at 90–100° C., a more flexible sheet was obtained. It was also outstanding in its resistance to hydrolysis.

EXAMPLE 3

A low-molecular-weight polyester was prepared by the procedure given in Example 1 using the following amounts of materials:

7 molecular proportions of 1,4-cyclohexanedimethanol
6 molecular proportions of azelaic acid
0.14 molecular proportion of trimethylolpropane The product was a polyester of average molecular weight 1194 (ebullimetric in benzene) and an hydrozyl number of 75.

Eighty parts of this polyester was stirred approximately 3 minutes with 2.5 parts of water, 0.4 part of diethylethanolamine, and 0.1 part of an emulsifying agent such as Emulphor EL–719. In the meantime a slurry of 2.5 parts of ethyl cellulose in 30 parts of tolylenediisocyanate was prepared. This was then added to the vigorously stirred polyester mixture and stirring continued for 20 to 30 seconds. The foaming mass was then poured into a form approximately 1.5 liters in size. The form was filled completely in a few minutes. The foam was cured at 80° C. for 16 hours. It gave a semirigid type foam which had uniform cellular structure and high resistance to moisture. It had a density of about 4 lb./cu. ft.

The above described polyesters can be mixed with any of the diisocyanates and triisocyanates listed above to give tough, elastic, rubber-like products that retain their flexibility at low temperatures and possess excellent heat stability. The properties of the product will depend to some extent upon the particular diisocyanate used, the ratio of diisocyanate to the polyester, and the nature of the catalyst, if one is employed.

In other typical preparations, 25 parts of the polyester was mixed with 4 parts of 1,6-hexamethylenediisocyanate. The mixing was carried out as rapidly as possible in a sigma-blade mixer at 20–30° C. The mixture was then placed in a mold and heated at 80–100° C. for 1 hour to give sheets 6″ x 6″ x ⅛″. The sheets had a high tensile strength and showed substantially no hydrolysis when boiled in water for 96 hours.

Using the general procedure described above, polyesters were made from other related materials such as dimethyl ethylbutylmalonate, dimethyl terephthalate, 4,4′-oxydibutanol, 2-hydroxymethyl-2-methyl-1,3-propanediol, etc. using at least 50 mole percent of cyclohexanedimethanol. One hundred parts of such polyesters were mixed rapidly with 35 parts of tolylenediisocyanate, 1 part of N-methylmorpholine, and 3 parts of water. Various samples of these mixtures were poured into molds. They expanded to give foams having a volume about 10–12 times the volume of the original mixture. The foams retained their properties at temperatures well in excess of 100° C. for extensive periods of time and showed excellent resistance to hydrolysis.

Using the general procedure described above, various polyesters were dissolved in dry benzene and two molecular equivalents of 2,4-tolylenediisocyanate was added. The products obtained were valuable as textile finishing agents, adhesives and protective coatings. For example, a nylon fabric padded with such a product and cured at above 100° C. for 30 minutes had good hand and resistance to static electrification.

All the foams shown in Table 1 were prepared in the same manner. The reagents were mixed together in a beaker, usually with a spatula, after which the reacting mixture was poured into a mold and allowed to foam and set for several hours. The foam was then demolded and heated three hours at 80–85° C. to complete the reaction. The appearance of the foam was noted, and the density of the foam was determined by the weight of a known volume of cavity-free foam. In these experiments, the polyester, catalyst, and emulsifier was mixed, a slurry of ethyl cellulose in tolylene diisocyanate added, stirred for 3 minutes with a spatula, and finally water added. The mixture was stirred briefly and rapidly, then poured into the mold. The polyesters used were prepared from 1,4-cyclohexanedimethanol (75% trans) and either azelaic acid or dibutyl azelate. Trimethylolpropane was added as a cross-linking reagent. The foams which have been prepared are listed in Table 1. Flexible foams of promising appearance were obtained. The density of these foams is rather high, but they have been obtained with low TDI/PE ratio which makes them appear economically attractive to produce. The rigid foams which have been obtained appear excellent.

From the experiments that have been performed, it appears that:

(1) Diethyl ethanolamine is a superior catalyst to N-methylmorpholine.

(2) The polyester molecular weight should preferably be in the range 1000 to 1500.

(3) A polyester prepared from azelaic acid appears to give a more uniform foam than one from azelaic esters.

Abbreviations used below:

PE—Polyester
DEEA—N,N-diethyl ethanolamine
N-MM—N-methylmorpholine
EL–719—Emulphor EL–719 (Antara Chem.)
TX–100—Triton X–100 (Rohm and Haas Co.)
T–10—Ethyl cellulose T–10 (Hercules Powder Co.)
TDI—m-Tolylenediisocyanate (mixed isomers)

*Properties of polyesters*

| Polyester | Mol. Wt. | Percent OH | Acid No. | Prepared from 1,4-Cyclohexanedimethanol and— |
|---|---|---|---|---|
| A | 1,380 | 1.79 |  | dibutyl azelate. |
| B | 2,865 | 1.32 |  | Do. |
| C | 1,580 | 1.80 | 4.67 | azelaic acid. |
| D | 1,345 | 2.81 | 5.04 | azelaic acid, trimethylolpropane. |

Table 1

| Exp. | Polyester | TDI/PE | Excess TDI/H₂O | Catalyst | Cat. Percent of PE | Emulsifier | Emul. Percent of PE | Percent of TDI | Foam Density, lb./ft.³ | Remarks |
|---|---|---|---|---|---|---|---|---|---|---|
| 1-A | A | 2.0 | 0.25 | N-MM | 1 | TX-100 | 0.2 | 3 | 9.3 | Uniform, small cells, flexible. |
| 1-C | A | 4.0 | 0.25 | N-MM | 1 | TX-100 | 0.2 | 3 | 5.3 | Uniform, large cells. |
| 1-D | A | 2.0 | 0.50 | N-MM | 1 | TX-100 | 0.2 | 3 | 8.1 | Uniform, small cells, flexible. |
| 1-F | A | 4.0 | 0.50 | N-MM | 1 | TX-100 | 0.2 | 3 | 5.6 | Uniform, large cells. |
| 1-G | A | 2.0 | 1.0 | N-MM | 1 | TX-100 | 0.2 | 3 | 8.7 | Uniform, small cells, flexible. |
| 1-I | A | 4.0 | 1.0 | N-MM | 1 | TX-100 | 0.2 | 3 | 6.2 | Uniform, large cells. |
| 2-C | B | 4.0 | 0.25 | N-MM | 1 | TX-100 | 0.2 | 3 | 6.5 | Good foam. |
| 2-D | B | 3.0 | 0.5 | N-MM | 1 | TX-100 | 0.2 | 3 | 6.2 | Do. |
| 3-B | C | 4.0 | 0.5 | DEEA | 1 | TX-100 | 0.2 | 3 | 4.4 | Small, fairly uniform cells. |
| 4-C | D | 4.0 | 1.0 | DEEA | 1 | TX-100 | 0.2 | 3 | 3.7 | Uniform, stiff foam. |
| 4-D | D | 4.0 | 0.5 | DEEA | 1 | TX-100 | 0.2 | 3 | 3.7 | Do. |
| 4-E | D | 4.0 | 0.25 | DEEA | 1 | TX-100 | 0.2 | 3 | 3.4 | Do. |

In addition to the examples specifically set forth above, it is apparent that a great number of variations and modifications can be accomplished in accordance with the techniques known to be useful in using other materials well known in the art.

EXAMPLE 4

A mixture of 144 g. (1.0 mole) of 1,4-cyclohexanedimethanol and 308 g. (0.9 mole) of $C_{20}$ saturated dibasic acid from Shell Development Company (understood to be a mixture of 60% eicosanedioic acid and 8-ethyloctadecanedioic acid) was placed in a flask equipped with a stirrer, thermometer, nitrogen inlet tube, and a distilling head. This mixture was heated with stirring at 200–220° C. for 4 hours during which time 32 ml. of water were collected. The pressure was reduced to less than 1 mm. and the temperature raised to 250° C. for 1 hour to remove the final traces of water.

The product was viscous liquid, light yellow in color. The molecular weight (ebullimetric in benzene) was 1740, acid number 1.8, and hydroxyl number 63.5 (1.93% hydroxyl). Its equivalent weight was thus 880.

This polyester was converted into a foam using the conditions of experiment 4-D, Table 1, above. Eighty-eight parts (0.1 equivalent) of the polyester was thoroughly mixed for three minutes with 5.4 parts (0.6 equivalent) of water, 0.9 part of diethylethanolamine, and 0.2 part of Emulphor EL-719. To this, a slurry of 35 parts of tolylenediisocyanate $$\left(0.4 \text{ equivalent}, \frac{TDI}{PE}=4.0, \frac{\text{excess } TDI}{\text{water}}=0.5\right)$$

and 2.5 parts of ethyl cellulose was added rapidly and the mixture stirred vigorously for 30 seconds. The foaming mass was poured into a mold and allowed to stand one hour. It was then cured at 80° C. for 16 hours.

The foam was almost colorless, had a uniform small cell structure, and a density of 3.6 lb./ft.³. It was distinctly softer and more flexible than the foam prepared in experiment 4-D, a result no doubt due to the longer chain length of the acid component of the polyester.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. In a process for preparing a polyester-urethane made by the following general procedure comprising (A) reacting together at least the following ingredients (1) a liquid polyester principally prepared from bifunctional reactants which is a polyester of at least one dicarboxylic acid containing at least 3 carbon atoms and at least one glycol, said polyester having a hydroxyl number of from 30 to 140 and an acid number of from 0 to 15 and a weight average molecular weight of from about 700 to about 3500, and (2) at least one organic polyisocyanate composed of carbon, hydrogen, oxygen and nitrogen, containing at least 50 mole percent of an organic diisocyanate the ratio of the equivalents of said polyisocyanate to the equivalents of said polyester based on its hydroxyl content being from about 1.0 to about 4.5, said reacting being accomplished with agitation and (B) curing the reaction mixture in a shape determined by the space in which it is contained at about 50°–140° C., the improvement consisting of employing at least 50 mole percent of cyclohexanedimethanol as said glycol.

2. In a process for preparing an elastomeric polyesterurethane made by the following general procedure comprising (A) reacting together at least the following ingredients (1) a liquid polyester principally prepared from bifunctional reactants which is a polyester of at least one dicarboxylic acid containing at least 3 carbon atoms and at least one glycol, said polyester having a hydroxyl number of from 30 to 140 and an acid number of from 0 to 15 and a weight average molecular weight of from 700 to about 3500, and (2) at least one organic polyisocyanate composed and carbon, hydrogen, oxygen and nitrogen, containing at least 50 mole percent of an organic diisocyanate, the ratio of the equivalents of said polyisocyanate to the equivalents of said polyester based on its hydroxyl content being from about 1.0 to about 2.0, said reacting being accomplished with agitation for a short period of time, and (B) curing the reaction mixture in a shape determined by the space in which it is contained at about 50°–140° C., the improvement consisting of employing at least 50 mole percent of cyclohexanedimethanol as said glycol.

3. A process as defined by claim 2 wherein said dicarboxylic compound is adipic acid, said glycol is 1,4-cyclohexanedimethanol and said polyisocyanate is m-tolylenediisocyanate.

4. A process as defined by claim 2 wherein the reaction mixture prepared in (A) is dissolved in benzene and applied to a textile fabric prior to curing (B) whereby said benzene is evaporated.

5. A process as defined by claim 2 wherein said dicarboxylic compound is azelaic acid, said glycol is 1,4-cyclohexanedimethanol and said polyisocyanate is m-tolylenediisocyanate.

6. In a process for preparing polyester-urethane foam made by the following general procedure comprising (A) reacting together at least the following ingredients (1) a liquid polyester principally prepared from bifunctional reactants which is a polyester at least one dicarboxylic acid containing at least 3 carbon atoms and at least one glycol, said polyester having a hydroxyl number of from 30 to 140 and an acid number of from 0 to 15 and a weight average molecular weight of from about 700 to about 3500, (2) at least one organic polyisocyanate composed of carbon, hydrogen, oxygen and nitrogen, containing at least 50 mole percent of an organic diisocyanate, the ratio of the equivalents of said polyisocyanate to said polyester based on its hydroxyl content being from about 2.0 to 4.5, and (3) water, there being from about 1.0 to 4.0 equivalents of water for each equivalent of said polyisocyanate in excess of the equivalents of said polyester, said reacting of (1), (2) and (3) being accomplished with agitation for a short period in the presence of an emulsifier composition so as to form a foamed liquid, (B) allowing the foamed liquid reaction mixture to form a solid foamed product shaped according to a space in which it is contained, and (C) curing the foamed product at 50°–100° C., the improvement consisting of employing, at least 50 mole percent of cyclohexanedimethanol as said glycol.

7. A process as defined by claim 6 wherein said polyester is prepared from azelaic acid as the dicarboxylic compound and a mixture of 1,4-cyclohexanedimethanol with 2 mole percent thereof of trimethylolpropane, and said polyisocyanate is m-tolylenediisocyanate.

8. A process as defined by claim 7 wherein (a) said polyester is mixed with water and about 0.1–2% of an amine catalyst, (b) said mixture is agitated and said m-tolylenediisocyanate is added, and (c) the resultant foaming mixture is placed in a mold.

9. A polyester-urethane produced by the process defined by claim 1.

10. A polyester-urethane produced by the process defined by claim 2.

11. A polyester-urethane produced by the process defined by claim 3.

12. A polyester-urethane produced by the process defined by claim 6.

13. A polyester-urethane produced by the process defined by claim 7.

14. A textile fabric coated with a polyester-urethane produced by the process defined by claim 4.

References Cited in the file of this patent

UNITED STATES PATENTS

| | | |
|---|---|---|
| 2,437,046 | Rothrock | Mar. 2, 1948 |
| 2,650,212 | Windemuth | Aug. 25, 1953 |
| 2,764,565 | Hoppe et al. | Sept. 25, 1956 |

UNITED STATES PATENT OFFICE
CERTIFICATE OF CORRECTION

Patent No. 2,956,961                            October 18, 1960

Charles J. Kibler et al.

It is hereby certified that error appears in the printed specification of the above numbered patent requiring correction and that the said Letters Patent should read as corrected below.

Column 2, lines 7 and 8, for "consist" read -- consists --; column 6, line 4, for "ether" read -- other --; column 10, line 41, for "composed and " read -- composed of --.

Signed and sealed this 25th day of April 1961.

(SEAL)
Attest:

ERNEST W. SWIDER                                      DAVID L. LADD

Attesting Officer                                          Commissioner of Patents